423-490 SF
5/6/86 OF 000,059

United States Statutory Invention Registration [19]

[11] Reg. Number: H59
[45] Published: May 6, 1986

Kreuzmann et al.

[54] PROCESS FOR CONVERTING MAGNESIUM FLUORIDE TO CALCIUM FLUORIDE

[75] Inventors: Alvin B. Kreuzmann, Cincinnati; Deborah A. Palmer, Mason, both of Ohio

[73] Assignee: The United States of America as represented by the United States Department of Energy, Washington, D.C.

[21] Appl. No.: 685,100

[22] Filed: Dec. 21, 1984

[51] Int. Cl.[4] ..... C01F 11/22; C01F 5/28; C01F 1/00

[52] U.S. Cl. ..... 423/490; 423/155

[58] Field of Search ..... 423/18, 490, 583

[56] References Cited

U.S. PATENT DOCUMENTS

| | | | |
|---|---|---|---|
| 3,853,541 | 12/1974 | Othmer | 423/76 |
| 4,012,493 | 3/1977 | Layne et al. | 423/490 |
| 4,021,530 | 5/1977 | Layne et al. | 423/490 |
| 4,272,293 | 6/1981 | Hooykaas | 106/73.6 |

OTHER PUBLICATIONS

D.F. Othmer et al., "Metal Ordering by Choline Affinity for Oxides", Metallurgical Society of AIME Light Metals Committee Proceedings of the Sessions, vol. 1, 1973, pp. 271-298.

L. F. Grantham, R. L. Gay, D. E. McKenzie, The Decontamination of Magnesium Fluoride Waste From Uranium Production: Process Evaluation and Preliminary Economics, Apr. 30, 1985, prepared for U.S. Department of Energy under contract DE-AT0-3-83SF11948 by Rockwell International.

*Primary Examiner*—John F. Terapane
*Assistant Examiner*—Jack Thomas
*Attorney, Agent, or Firm*—Katherine Lovingood; Stephen D. Hamel; Judson R. Hightower

[57] ABSTRACT

This invention is a process for the conversion of magnesium fluoride to calcium fluoride whereby magnesium fluoride is decomposed by heating in the presence of calcium carbonate, calcium oxide or calcium hydroxide. Magnesium fluoride is a by-product of the reduction of uranium tetrafluoride to form uranium metal and has no known commercial use thus its production creates a significant storage problem. The advantage of this invention is that the quality of calcium fluoride produced is sufficient to be used in the industrial manufacture of anhydrous hydrogen fluoride, steel mill flux or ceramic applications.

2 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PROCESS FOR CONVERTING MAGNESIUM FLUORIDE TO CALCIUM FLUORIDE

BACKGROUND OF THE INVENTION

The invention relates generally to a process for converting magnesium fluoride ($MgF_2$) to a useable product and more specifically to the conversion of $MgF_2$ to calcium fluoride ($CaF_2$) using calcium hydroxide ($Ca(OH)_2$), calcium oxide (CaO) or calcium carbonate ($CaCO_3$) and is a result of a contract with the United States Department of Energy.

In the reduction of uranium tetrafluoride to uranium metal with magnesium for use at various DOE facilities, large quantities of $MgF_2$ slag are produced. Presently this magnesium fluoride is processed through one of two routes depending on whether it contains enriched or depleted uranium. If the slag is produced from reduction of enriched uranium it is processed by leaching with nitric acid for uranium solubilization and recovery. The uranium barren slag is neutralized with lime, filtered, placed in drums and eventually dried for long term storage. Some of the magnesium fluoride, from both depleted and enriched uranium, is recycled as liner material for future reductions. The slag from depleted uranium production, when not recycled, is placed in below ground pit storage, but the procedure of burying materials can threaten underground water sources. It is preferred to minimize the amount of slag requiring storage, therefore a project was begun to develop a process converting the magnesium fluoride slag to usable, recyclable and possibly saleable material.

An attempt was made to use the $MgF_2$ to make anhydrous hydrogen fluoride (HF) but the reaction proved to be very slow and incomplete and resulted in a need for storage of voluminous quantities of magnesium sulfate contaminated with residual uranium. Since anhydrous HF is usually made from $CaF_2$, investigation were begun to study the possibility of converting $MgF_2$ to $CaF_2$ but the literature was not encouraging, Mellor's *A Comprehensive Treatise on Inorganic and Theoretical Chemistry* specifically states that CaO does not react with $MgF_2$; that $MgF_2$ is decomposed by alkali carbonates, not mentioning alkaline earth carbonates (such as $CaCO_3$); and is silent on the use of $Ca(OH)_2$ in such a process. Nevertheless work was begun to see if $MgF_2$ would be decomposed using CaO, $CaCO_3$ or $Ca(OH)_2$.

SUMMARY OF THE INVENTION

In view of the above-mentioned need, it is an object of this invention to provide a process for the conversion of $MgF_2$ to $CaF_2$.

It is another object of this invention to solve the problem of storage of large quantities of $MgF_2$.

It is further object of this invention to convert $MgF_2$ to a useable substance.

Additional objects, advantages and novel features of the invention will be set forth in part in the description that follows, and in part will become apparent to those skilled in the art upon examination or may be learned by practice of the invention. The objects and advantages of the invention may be realized and attained by means of instrumentalities and combinations particularly pointed out in the appended claims.

To achieve the foregoing and other objects, the process is generally the conversion of $MgF_2$ to $CaF_2$ by mixing either CaO, $Ca(OH)_2$, or $CaCO_3$ with $MgF_2$ and heating the mixture to at least 1,600° F. for not less than two hours. The reactions that take place are:

$$MgF_2(solid)+CaO(solid)\rightarrow CaF_2(solid)+MgO(solid)$$

$$MgF_2(solid)+Ca(OH)_2(solid)\rightarrow CaF_2(solid)+MgO(solid)+H_2O(gas)$$

$$MgF_2(solid)+CaCO_3(solid)\rightarrow CaF_2(solid)+MgO(solid)+CO_2(gas)$$

The solid by-product, MgO, is removed from $CaF_2$ using an acid leach and filtration to separate the solution from the solid $CaF_2$. This $CaF_2$ cake is dried to provide $CaF_2$ powder. The other by-products, $CO_2$ and $H_2O$, are gases and naturally depart as such. Since $HNO_3$, HCl, $H_2SO_4$ or any organic acid will work for the acid leach, the preferred acid depends on economic considerations and the by-products desired.

This method of converting $MgF_2$ to $CaF_2$ is advantageous because the resulting $CaF_2$ is useful in the manufacture of anhydrous HF whereas $MgF_2$ is of no known commercial use.

DETAILED DESCRIPTION OF THE PREFERRED EMBODIMENT

The invention is a process whereby $MgF_2$, particularly $MgF_2$ slag formed in the reduction of $UF_4$ with Mg, is converted to $CaF_2$ using either CaO, $Ca(OH)_2$ or $CaCO_3$. The three compounds were tested, each giving especially satisfactory results yielding better than 90% conversion from $MgF_2$ slag, so the choice of the calcium compound is discretionary.

The $MgF_2$ slag containing small amounts of uranium (2–2.5%), magnesium oxide (1–1.5%), and water (0.1–0.5%) is milled to increase its surface area and mixed with either calcium oxide, calcium hydroxide or calcium carbonate using stoichiometric amounts or slight excesses of the calcium containing compounds. This mixture is placed in a furnace and heated to at least 1,600° F. for two hours or more to form $CaF_2$ and the by-products. After the reaction is complete the by-products are separated from the $CaF_2$ by leaching with an acid solution. Sufficient acid must be used for stoichiometric reaction with the MgO and uranium which is present. The acid can be HCl, $HNO_3$, $H_2SO_4$ or any organic acid. The chosen acid must be dilute enough to keep the resulting magnesium salts in solution. In tests, a 7–8 N $HNO_3$ solution was used with excellent results.

The acid solution containing the by-products is filtered from the solid $CaF_2$ leaving a $CaF_2$ cake that contains approximately 50% water. The cake is dried with heat, yielding a product of better than 90% $CaF_2$. The impurities are $MgF_2$ and less than 500 ppm uranium.

Since the literature stated that treatment of $MgF_2$ with CaO would not yield $CaF_2$ and also suggested that using $CaCO_3$ and $Ca(OH)_2$ would be unsuccessful, it was surprising that all three gave such impressive results.

The $CaF_2$ produced is of sufficient purity to be used in the industrial manufacture of anhydrous HF. This is a considerable advantage since the $MgF_2$ from which it is made has no use and creates a significant disposal or storage problems. The by-product MgO can be converted to Mg metal, however, known processes are not economically feasible under present industrial conditions. Although incomplete, procedures are being developed to convert the MgO to magnesium metal which could be used or perhaps sold, thus eliminating the burdensome storage problem.

The foregoing description of a preferred embodiment has been presented to explain the invention and enable others skilled in the art to best utilize it in a particular application. Obviously, many modifications are possible and one versed in the art will be able to determine the most suitable process conditions for any given set of circumstance without resorting to undue experimentation.

We claim:

1. A process for the conversion of $MgF_2$ to $CaF_2$ comprising:

mixing $MgF_2$ with a stoichiometric amount or slight excess of a calcium-containing compound selected from the group CaO, $Ca(OH)_2$, and $CaCO_3$;

heating said mixture to 1,600° F. or higher for two hours or longer to convert said magnesium fluoride and said calcium-containing compound to $CaF_2$ and by-products;

leaching said $CaF_2$ and said by-products with an acid solution of sufficient concentration to dissolve said by-products;

removing said acid and by-product solution from said $CaF_2$ resulting in wet $CaF_2$ that contains approximately 50% water; and drying said wet $CaF_2$ to produce $CaF_2$.

2. The process of claim 1 wherein said acid is selected from the group $HNO_3$, HCl, $H_2SO_4$ and all organic acids.

* * * * *